United States Patent
Riordan et al.

[11] Patent Number: 6,078,891
[45] Date of Patent: Jun. 20, 2000

[54] METHOD AND SYSTEM FOR COLLECTING AND PROCESSING MARKETING DATA

[76] Inventors: John Riordan, 234 Clinton St., Brooklyn, N.Y. 11201; Bruce Morehouse, 58 Knights Pond Rd., Northport, Me. 04849

[21] Appl. No.: 08/977,479

[22] Filed: Nov. 24, 1997

[51] Int. Cl.[7] .................................................. G06F 17/60
[52] U.S. Cl. ................................ 705/10; 705/23; 705/16
[58] Field of Search ................... 705/10, 26, 27, 705/16, 17, 22, 23; 235/14

[56] References Cited

U.S. PATENT DOCUMENTS

| | | | |
|---|---|---|---|
| 3,956,615 | 5/1976 | Anderson et al. | 380/24 |
| 4,319,336 | 3/1982 | Anderson et al. | 705/21 |
| 4,340,810 | 7/1982 | Glass | 235/375 |
| 4,355,372 | 10/1982 | Johnson et al. | 379/92.04 |
| 4,438,824 | 3/1984 | Mueller-Schloer | 380/23 |
| 4,799,156 | 1/1989 | Shavit et al. | 705/26 |
| 4,943,963 | 7/1990 | Waechter et al. | 370/428 |
| 4,951,196 | 8/1990 | Jackson | 705/37 |
| 4,972,504 | 11/1990 | Daniel, Jr. et al. | 705/10 |
| 5,103,392 | 4/1992 | Mori | 380/4 |
| 5,202,977 | 4/1993 | Pasetes, Jr. et al. | 395/500.48 |
| 5,253,345 | 10/1993 | Fernandes et al. | 705/17 |
| 5,315,093 | 5/1994 | Stewart | 235/381 |
| 5,331,544 | 7/1994 | Lu et al. | 705/10 |
| 5,490,060 | 2/1996 | Malec et al. | 705/10 |
| 5,490,252 | 2/1996 | Macera et al. | 709/249 |
| 5,491,473 | 2/1996 | Gilbert | 340/870.01 |
| 5,499,385 | 3/1996 | Farmwald et al. | 710/3 |
| 5,513,102 | 4/1996 | Auriemma | 705/14 |
| 5,521,363 | 5/1996 | Tannenbaum | 235/379 |
| 5,557,518 | 9/1996 | Rosen | 380/24 |
| 5,557,780 | 9/1996 | Edwards et al. | 395/500.48 |
| 5,590,196 | 12/1996 | Moreau | 380/18 |
| 5,590,197 | 12/1996 | Chen et al. | 380/24 |
| 5,592,378 | 1/1997 | Cameron et al. | 705/27 |
| 5,592,560 | 1/1997 | Deaton et al. | 382/100 |
| 5,604,804 | 2/1997 | Micali | 380/25 |
| 5,608,874 | 3/1997 | Ogawa et al. | 709/246 |
| 5,684,965 | 11/1997 | Pickering | 705/34 |
| 5,687,322 | 11/1997 | Deaton et al. | 705/14 |
| 5,832,460 | 11/1998 | Bednar et al. | 705/27 |

*Primary Examiner*—Emanuel Todd Voeltz
*Assistant Examiner*—Thomas A. Dixon
*Attorney, Agent, or Firm*—Pennie & Edmonds LLP

[57] ABSTRACT

A system and method for the collection of marketing data simultaneously captures at a point-of-sale all financial and non-financial data pertaining to a specific consumer transaction. An electronic invoice is constructed from the captured data and transmitted to a credit authorization location via a communication link necessarily established to transmit a credit authorization request for the transaction. The electronic invoice contains line item data for each item purchased as part of the transaction. The invoice is organized around the identification number of the payment vehicle employed by the customer to pay for the transaction, thus linking the purchasing information contained in the invoice to a particular consumer. The credit authorization location receives the transmitted electronic invoice and forwards the invoice to a data warehouse, which may be located in a location remote from the credit authorization location. The data warehouse comprises a plurality of related data structures for storing the received data. The related data structures facilitate simple and flexible analysis and searching of the collected market data.

10 Claims, 6 Drawing Sheets

| Date | 1997/08/29 |
| --- | --- |
| Time | 15:45:23 |
| Retailer Location ID | 4399003906512359 |
| Payment Vehicle ID | 1111 2222 3333 4444 |
| Invoice Number | RKD 199708293415 |
| Total Amount | $514.81 |
| Number of Items | 4 |

| Product ID | Quantity | Unit Price | Total Price | Remarks |
| --- | --- | --- | --- | --- |
| 011115-396001 | 1 | $254.00 | $254.00 | |
| 025784-300153 | 20 | $2.54 | $50.80 | |
| 738168-004102 | 1 | $185.49 | $185.49 | |
| Tax | | | $24.52 | |

METHOD AND SYSTEM FOR COLLECTING AND PROCESSING MARKETING DATA

FIELD OF THE INVENTION

The invention relates to a system and method for collecting and processing marketing data.

BACKGROUND OF THE INVENTION

Market research is an important business tool which permits manufacturers, retailers, financial institutions, and others to cost-effectively target their marketing and sales activities and efficiently reach potential customers. These organizations rely heavily on market data in planning new products, sales strategies and promotions, and when making a variety of other sales and marketing related business decisions.

In the past, marketing data has been collected in several ways. Typically, market research firms are employed to collect data using surveys, questionnaires, and other costly and time-consuming techniques. This information is then processed using statistical techniques in an effort to extrapolate therefrom significant trends in consumer behavior. Although based on statistically significant correlations, these techniques cannot with absolute precision determine the buying patterns of particular population segments or individual consumers. Indeed, as recognized in the art, such surveys often yield inaccurate and misleading results.

In contrast, some organizations, particularly large retailers, collect marketing data by tracking sales transactions at the retailers' points of sale. This technique, however, provides only crude data such as the number and types of items sold by the merchant. It does not provide detailed data regarding sales patterns of particular socioeconomic groups or individual customers.

To collect more precise data, retailers sometimes provide customers with "preferred customer" cards or the like. The "preferred customer" card typically comprises a customer identification number linked to a database record which stores information relating to the customer's past purchases. Each time the customer makes a purchase, the merchant scans or manually enters the customer identification number from the "preferred customer" card into the merchant's point of sale (POS) computer. The merchant then scans or manually enters the identification codes of the items purchased by the customer. Typically, the identification code employed to identify each product may be the product's Universal Product Code (UPC). In this way, it is possible to collect data regarding the purchasing patterns of particular customers.

This technique, too, has several drawbacks. First, it only collects sales data of the particular retailer who issued the "preferred customer" card. It does not permit data collected by a first retailer to be integrated and cross-referenced with data collected by other retailers. The collected data may therefore provide a significantly skewed perspective of a customer's purchasing patterns as a whole.

Furthermore, such systems require that the customer bring his or her card to the retailer's POS. To that end, retailers have been forced to offer a variety of incentives, such as discounts on particular items, in order to induce customers to carry and use their "preferred customer" cards. Notwithstanding such incentives, many customers forget to bring their cards to the POS.

Moreover, the systems require significant hardware and software resources to collect and maintain the collected data. Frequently, the customer data is transmitted from a remote retail site to a central computer maintained by the merchant. This marketing data infrastructure is often completely separate from the merchant's sales data infrastructure and thus leads to wasteful duplicative processing of the transaction data being collected.

SUMMARY OF THE INVENTION

The present invention overcomes the drawbacks of the prior art by providing a system and method for efficient collection and organization of marketing data.

In a preferred embodiment, the present invention simultaneously captures at the POS all financial and non-financial data pertaining to a specific consumer transaction. An electronic invoice is constructed from the captured data and transmitted to a credit authorization location via a communication link necessarily established to transmit a credit authorization request for the transaction. The electronic invoice contains line item data for each item purchased as part of the transaction. The invoice is organized around the identification number of the payment vehicle employed by the customer to pay for the transaction, thus linking the purchasing information contained in the invoice to a particular consumer.

The credit authorization location receives the transmitted electronic invoice and forwards the invoice to a data warehouse, which may be located in a location remote from the credit authorization location. The data warehouse comprises a plurality of related data structures for storing the received data. The related data structures permit simple and flexible analysis and searching of the collected market data.

BRIEF DESCRIPTION OF THE DRAWINGS

The above summary of the invention will be better understood when taken in conjunction with the following detailed description and accompanying drawings in which.

DETAILED DESCRIPTION OF THE PREFERRED EMBODIMENTS

Figure 1:
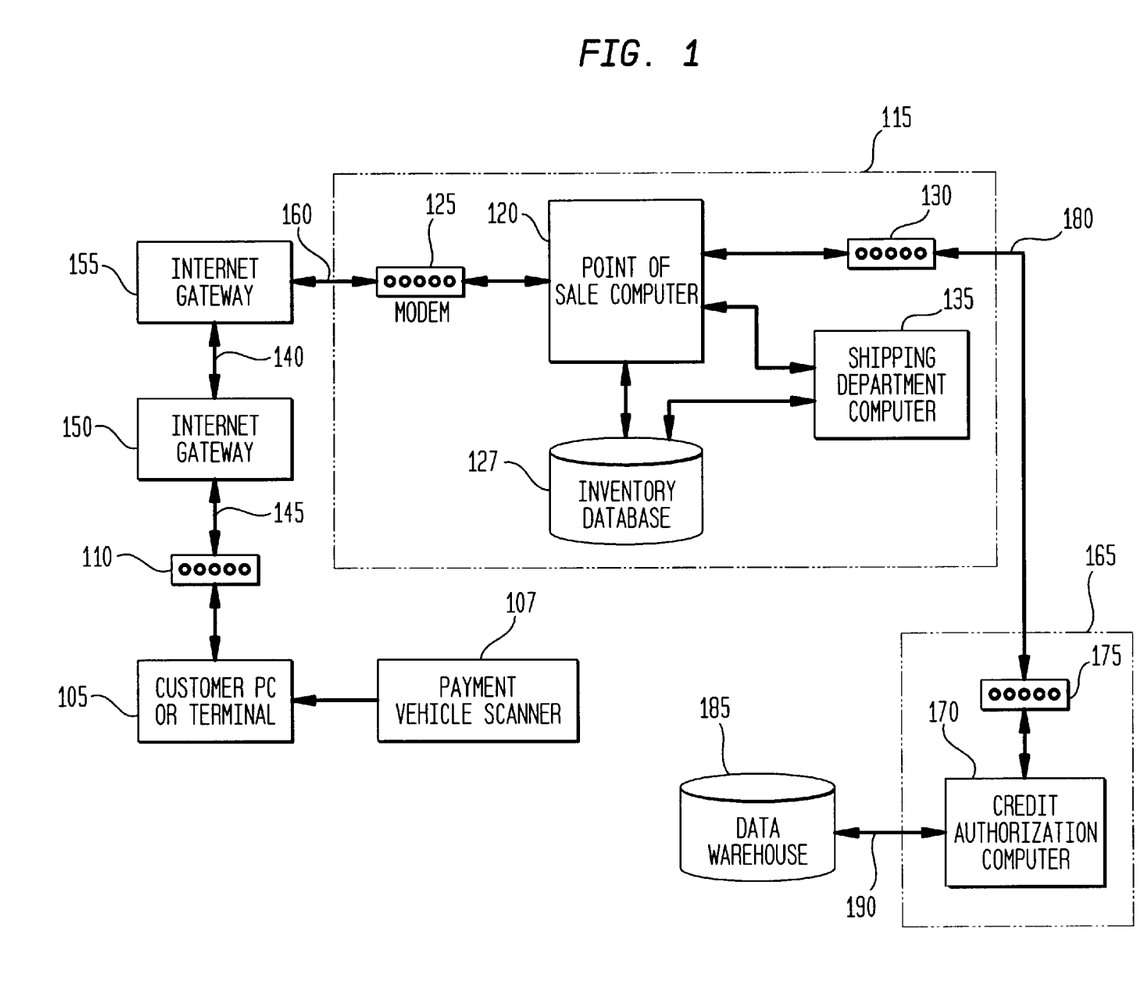
FIG. 1 is a block diagram of a system architecture suitable for implementing a first preferred embodiment of the present invention wherein sales transactions are conducted via the internet.

FIG. 1 shows a system architecture suitable for implementing the efficient market data collection system of the present invention in an internet purchasing environment. As shown in FIG. 1, the architecture comprises a customer terminal 105 typically located in a customer's home or workplace. Customer terminal 105 is provided with a modem 110. Modem 110 may be an internal modem located inside customer terminal 105 or may alternatively comprise an external modem. Customer terminal 105 may further be provided with a payment vehicle scanner 107, the purpose of which will be described below.

The architecture further comprises a POS location denoted generally as 115. POS location 115 comprises a POS computer 120 suitable for receiving and processing orders placed with a merchant. Associated with POS computer 120 is an inventory database 127 which stores information relating to the merchant's inventory such as the types of goods, quantity of goods, and price of goods in the merchant's inventory. POS computer 120 is further provided with a first modem 125 and a second modem 130.

POS location 115 may further comprise a shipping department computer 135 which is linked to POS computer 120. As described in more detail below, shipping department computer 135 receives invoices for orders placed with POS computer 120 and tracks filling and shipping of the order. Customer terminal 105 and POS computer 120 are adapted to permit communication therebetween via the internet. As known in the art, this connection is generally established via one or more internet gateways. Illustratively, as shown in FIG. 1, customer terminal 105 is typically connected to a first internet gateway 150 via a telephone line 145. Similarly, POS computer 120 is typically connected to a second internet gateway 155 via telephone line 160. Gateways 150 and 155 are typically connected via an internet backbone 140.

Gateways 150 and 155 are typically operated by internet service providers who provide access to the internet for a subscription fee. Alternatively, a large merchant might own and maintain its own internet gateway. In that instance, POS computer 120 would typically be connected directly to internet gateway 155 via a dedicated data line.

In other embodiments, customer computer 105 may be connected to POS computer 120 via a direct dial connection.

The architecture of FIG. 1 further comprises a credit authorization location 165 typically located in a location remote from POS location 115. Credit authorization location 165 is typically owned and operated by the financial institution which has issued the payment vehicle employed by the customer to pay for items purchased at the POS, as described in more detail below. Credit authorization location 165 preferably comprises a credit authorization computer 170 which receives credit authorization requests from POS computer 120, evaluates the received requests, and transmits to POS computer 120 an authorization of the transaction or a denial of the transaction depending on various parameters such as whether the requested credit line exceeds the credit limit of the customer.

Credit authorization computer 170 is provided with a modem 175. Typically, POS computer 120 and credit authorization computer are adapted to permit communication therebetween via telephone line 180 and modems 130, 175. Alternatively, other transmission paths for communicating credit requests and authorizations may be employed.

Also shown in FIG. 1 is a data warehouse 185 which may be located at credit authorization location 165 or alternatively may be located at a location remote from credit authorization location 165. As described in more detail below, data warehouse 185 stores detailed marketing data regarding transactions occurring at points of sale such as POS 115.

Figure 2:
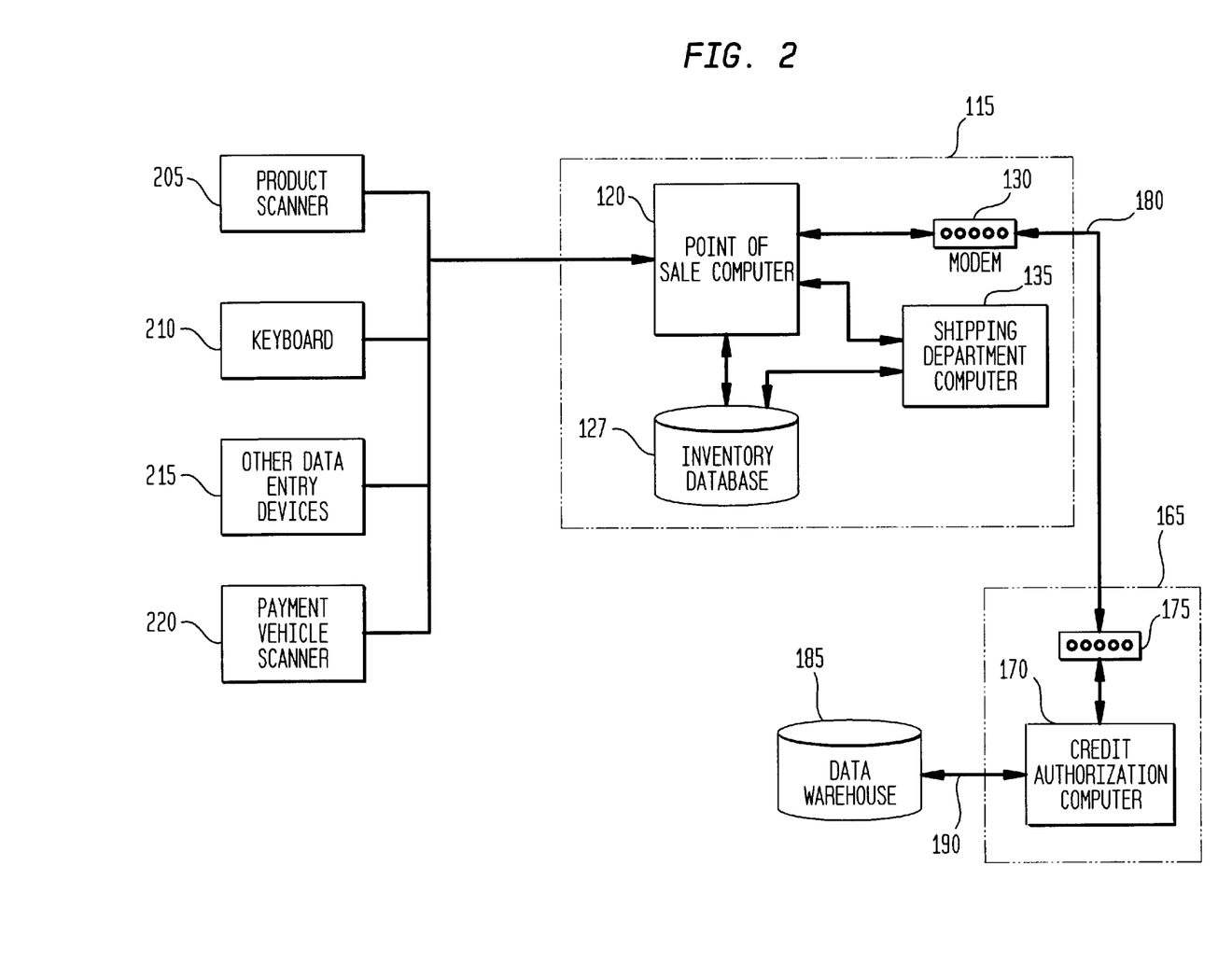
FIG. 2 is a block diagram of a system architecture suitable for implementing a second preferred embodiment of the present invention wherein sales transactions are conducted at a physical POS.

Turning to FIG. 2 there is shown an alternative architecture which illustrates the more traditional setting wherein a customer is physically located at the POS at the time of the transaction. As will be recognized, the architectures of the two purchasing environments share many common elements, and like elements in FIGS. 1 and 2 have been labelled with like reference numerals.

Thus, as shown in FIG. 2, the physical POS environment comprises a POS computer 120 which has associated therewith an inventory database 127 and a shipping department computer 135. Similarly, POS 120 is connected via modem 130 and telephone line 180 to credit authorization location 165.

In addition, the physical POS environment further comprises a product scanner 205 for scanning into POS computer 120 identification codes representative of the items to be purchased by the customer. Alternatively, the system may comprise a keyboard 210 or other data entry devices 215 for scanning this information. The system is further provided with a payment vehicle scanner 220 for scanning the identification number and associated PIN of the customer's payment vehicle into POS computer 120.

In the physical POS environment, a customer will typically collect in a basket or wagon the items he wishes to purchase, and bring them to a particular location where POS terminals are located. An employee of the merchant uses product scanner 205 to scan a bar code or other product identifier printed on the item into POS computer 120. Alternatively, the employee may manually enter information identifying the items to be purchased via keyboard 210 or other data entry devices 215.

Figure 3:
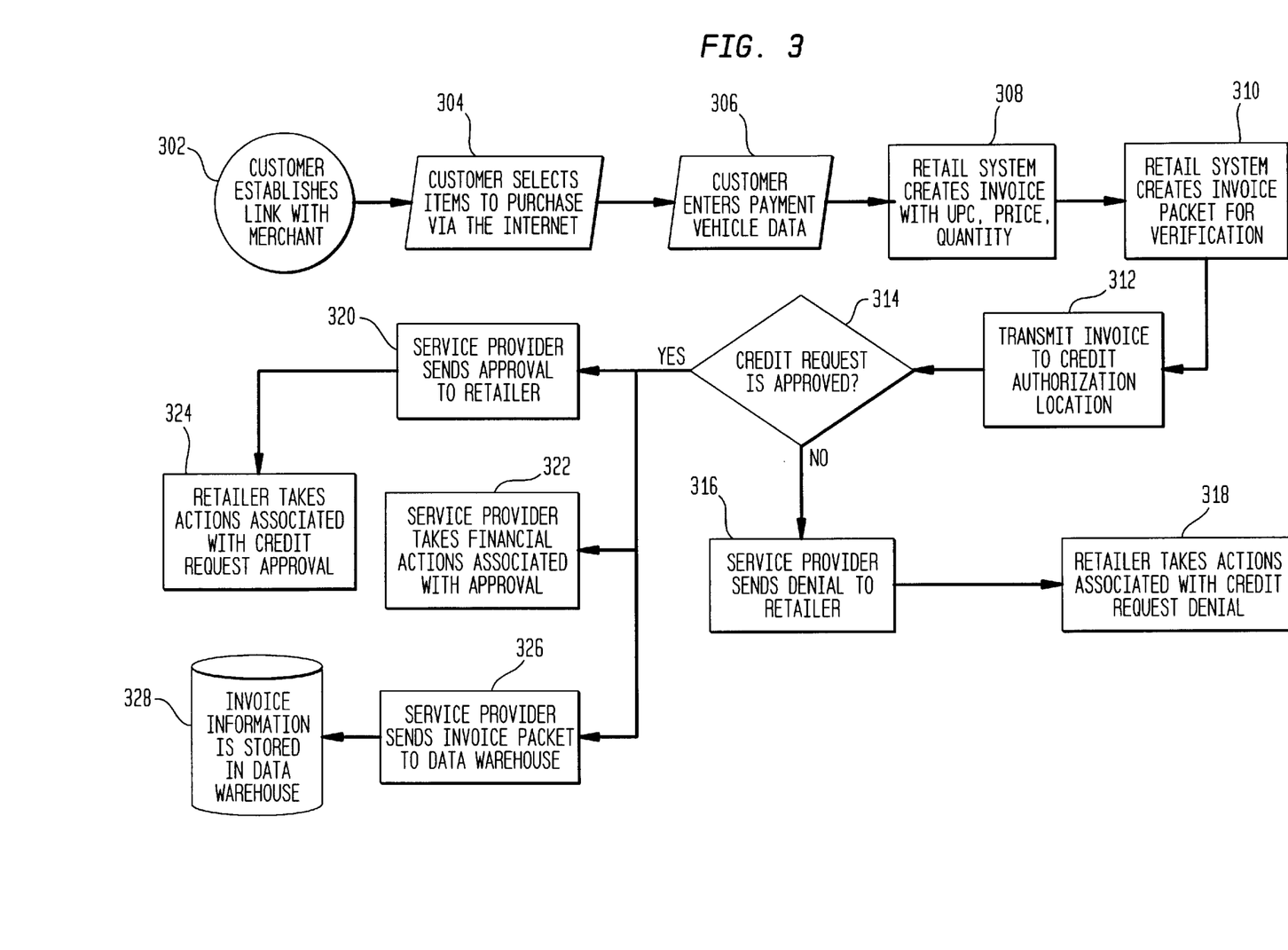
FIG. 3 is a flowchart depicting the operation of the first preferred embodiment of the present invention.

Operation of a preferred embodiment of the efficient market data collection system of the present invention in the internet purchasing environment will now be described in connection with FIG. 3. As shown in FIG. 3, in step 302 the customer establishes a link with POS computer 120 via internet backbone 140. To establish this link, the customer typically logs onto his internet account and is provided access to the internet via internet gateway 150. The customer then enters the web address of a retailer's website and is connected to the website via internet gateway 155.

In step 304 the customer selects the items which he desires to purchase. Illustratively, the merchant's website may comprise an interface which displays information regarding items offered for sale and may, for example, permit a customer to select items for purchase by clicking on icons or by typing in the identification number or name of particular items. Similarly, the interface may permit the customer to click on or otherwise identify how many of each item he wishes to purchase.

In step 306 the customer enters the identification number of the payment vehicle which he wishes to use to pay for the items to be purchased. This information is typically entered in response to a prompt from the merchant's website, and may be entered manually, or alternatively may be entered by swiping the payment vehicle through payment vehicle scanner 107. The payment vehicle employed by the customer preferably is a smart card. Alternatively, the payment vehicle may be a magnetic stripe card such as those employed as credit cards, charge cards, or debit cards, or any other payment vehicle which requires verification to authorize a transaction. As known in the art, smart cards provide enhanced security over traditional magnetic stripe cards because they are typically manufactured to be resistant to physical probing by electronic instruments and physical disassembly. In addition, smart cards may employ symmetric or asymmetric cryptography software in order to increase the security of communications between the smart card and a merchant.

In addition to the identification number of the vehicle, payment vehicle information generally comprises a PIN whose purpose is to ensure that the person employing the payment vehicle is authorized to do so.

Figure 4:
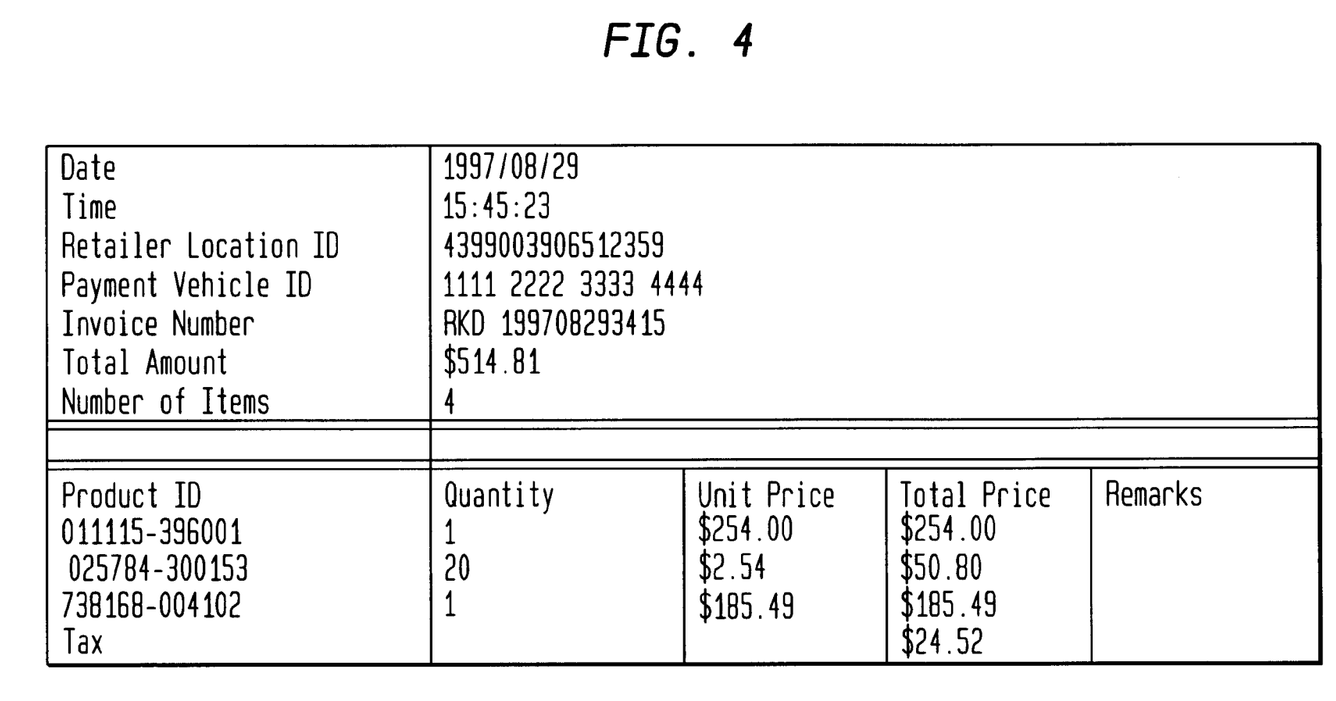
FIG. 4 is a schematic representation of a preferred embodiment for a line item listing in an electronic invoice.

In step 308, POS computer 120 creates an electronic invoice from the information entered by the customer. The invoice comprises a line item listing concerning the items purchased by the customer. Each line item entry in the listing comprises the identity of a purchased item, the cost of the item, and the number purchased of the item. Typically, the identity of the item is represented by an identification code such as a UPC number which is retrieved by POS computer from inventory database 127. One illustrative arrangement for the line item listing is shown in FIG. 4. As those skilled in the art will recognize, the particular fields shown in FIG. 4 are merely illustrative, and additional or different fields may alternatively be employed to customize the line item listing for a particular environment.

As shown in FIG. 4, a typical line item listing may comprise the following fields:

a date field, which stores the date on which the transaction occurred;

a time field, which stores the time at which the transaction occurred;

a retail location identification field, which stores a unique identifier typically allocated by credit authorization location 165 to identify the retail location submitting the line item listing;

a payment vehicle identifier, which stores the identification number of the payment vehicle used by the customer to pay for the transaction;

an invoice number field, which stores a unique identifier for the line item listing assigned by the retailer;

a total amount field, which stores the total dollar amount of the transaction;

a number of items field, which stores the number of distinct items purchased;

a product identifier field, which stores a unique identifier for a purchased product (typically a UPC or other standard code);

a quantity field, which stores the number of a product that was purchased;

a unit price field, which stores the price of a purchased product;

a total price field, which stores the product of the quantity field and the unit price field for each purchased product; and a remarks field, which stores remarks regarding the transaction that the merchant might have.

Line item entries may also be created for other aspects of the transaction, such as the tax, retailer discounts, etc. As illustratively shown in FIG. 4, such line item entries may comprise a unique alphanumeric code that identifies the item (e.g., "T-A-X") and is stored in the product identification field. The total amount of the item (e.g., the tax) may be stored in the total price field.

In step 310, a program resident in POS computer 120 creates an invoice packet for transmission to credit authorization location 165. The invoice packet comprises the line item listing described above. The invoice packet further comprises a request for authorization from credit authorization location 165. The request for authorization typically comprises the identification number and PIN of the customer's payment vehicle and the total amount of the sale.

In step 312, the invoice packet is transmitted to credit authorization location 165. In the prior art, transmission from the merchant to credit authorization computer 170 served only one purpose: To request authorization for a transaction. In contrast, the purpose of the invoice packet of the present invention is two fold: First, to request authorization for the transaction from credit authorization location 165, and second, to transmit to credit authorization location 165 a line item listing concerning the transaction. In this way, the invention efficiently employs the communications link established with credit authorization location 165 to simultaneously transmit thereto a line item listing comprising complete marketing data concerning the transaction.

In decision step 314, credit authorization computer 170 determines whether or not to approve the credit request received from POS computer 120. This determination typically comprises the step of determining whether the total cost of the items listed on the invoice exceeds the customer's credit limit. If the customer's credit limit is exceeded, then decision step 314 fails and the system proceeds to step 316 wherein credit authorization computer 170 transmits a denial message to POS computer 120 via line 180. In step 318, POS computer 120 receives the denial message from credit authorization computer 120 and cancels the transaction. The merchant may also take additional steps typically associated with a denial of a request for credit authorization, as known in the art.

If, on the other hand, the customer's credit limit is not exceeded, then decision step 314 succeeds and the system proceeds to step 320 wherein credit authorization computer 170 transmits a credit approval to POS computer 120 via line 180. Concurrently, in step 322 credit authorization computer 170 takes additional bookkeeping actions typically associated with approval of a financial transaction. For example, as known in the art, credit authorization computer 170 typically updates the customer's account by debiting the customer's credit limit in the amount of the transaction.

Upon receipt of the transaction authorization from credit authorization location 165, in step 324, the merchant commences steps to complete the sale. These typically include transmitting a confirmation to the customer and preparing the order for shipping.

In step 326, credit authorization computer 170 transmits a copy of the invoice packet received from POS computer 120 to data warehouse 185. As noted above, this invoice contains line item information on each item purchased by the customer as well the identification number of the payment vehicle used by the customer to pay for the transaction. In step 328, data warehouse 185 processes the received invoice packet and stores the marketing data contained therein in a relational database, as will be described in further detail below.

Thus, the present invention facilitates the collection of detailed line item purchasing information which is linked to a particular customer via his payment vehicle identification number, in a manner heretofore not possible. In particular, because the payment vehicle is employed as the central identifier for the transaction, each item in the line item listing is particularly identified with an individual customer. In addition, because the line item listing is transmitted as part of an invoice packet comprising a credit authorization request, the present invention allows efficient collection of marketing data by permitting marketing data to be collected at a central location without requiring an additional communication from the POS to a central data repository.

Operation of a preferred embodiment of the efficient market data collection system of the present invention in the physical purchasing environment will now be described in connection with FIG. 5.

Figure 5:
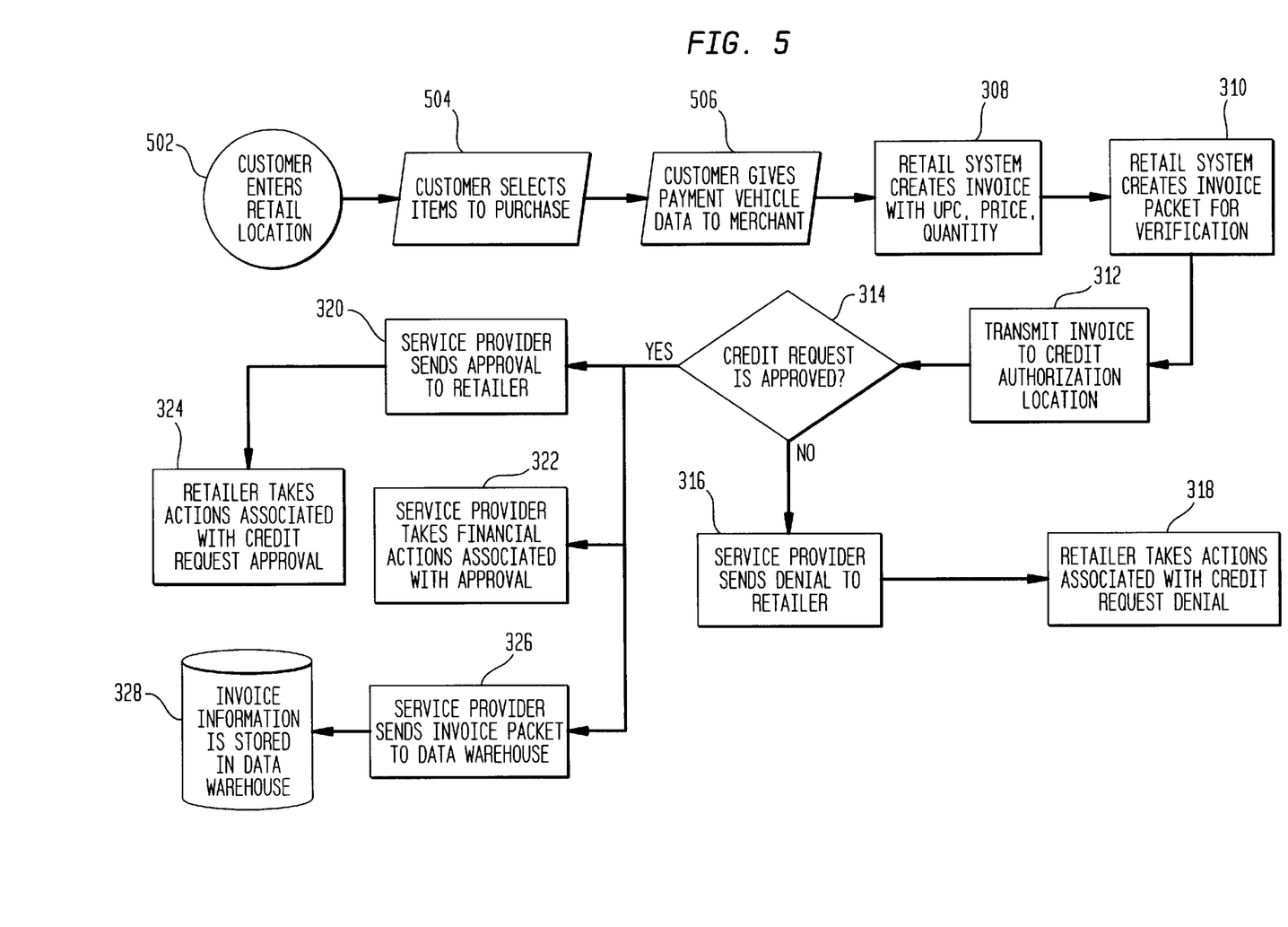
FIG. 5 is a flowchart depicting the operation of the second preferred embodiment of the present invention.

As shown in FIG. 5, in step 502, a customer enters a retail location maintained by a merchant. In step 504, the customer selects items to be purchased and brings them to a pointof-sale terminal. Also in step 504, an employee of the merchant uses product scanner 205 to scan a bar code or other code printed on the item into point-of-sale computer 120. Alternatively, the employee may manually enter information identifying the items to be purchased via keyboard 210 or other data entry devices 215. In step 506, the customer identifies for the merchant the payment vehicle to be used to pay for the selected items. Typically, the customer may hand the payment vehicle to an employee of the merchant or may alternatively swipe the payment vehicle through a payment vehicle scanner 220 located near point-of-sale computer 120.

The remainder of the steps performed in the physical-purchase embodiment of the present invention are the same as those performed in the on-line-purchase embodiment described above, and corresponding steps in FIGS. 3 and 5 are identified by corresponding numerals.

The present invention also provides a novel relational storage arrangement for the collected marketing data which facilitates data analysis. As described below, the data are stored in a relational database designed to facilitate flexible and particularized data searching. A schematic diagram illustrating a preferred relational database of the present invention is shown in FIG. 6.

Figure 6:
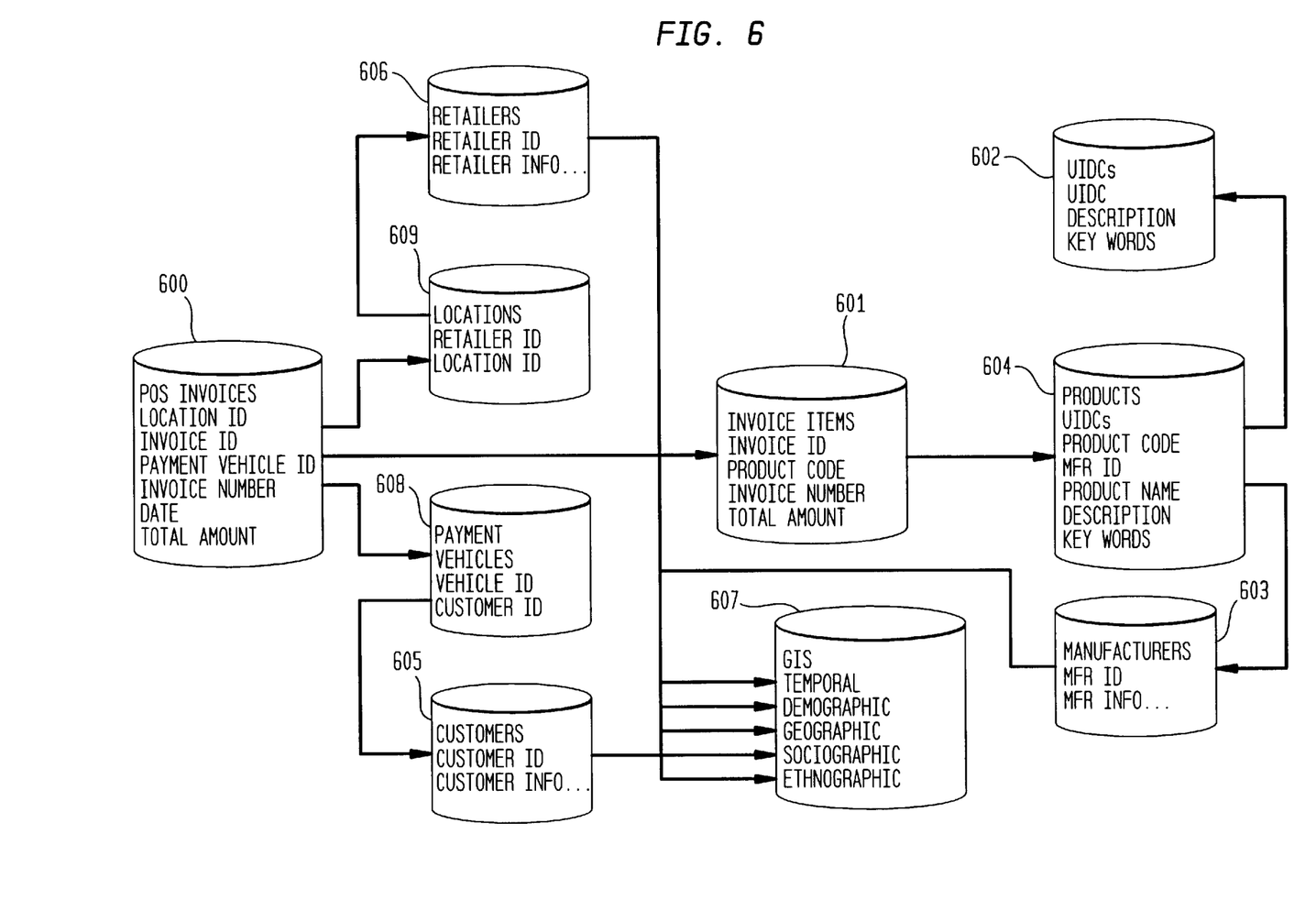
FIG. 6 is a block diagram of one possible structure of a data warehouse for storing collected marketing data.

As shown in FIG. 6, data warehouse 185 comprises a first data structure 600 for storing the content of received electronic invoices. Data warehouse 185 creates a new record in data structure 600 for each electronic invoice received from credit authorization location 165. In a preferred embodiment, the record may comprise the following fields:

- a retail location identification field, which stores the unique identifier typically allocated by credit authorization location 165 to identify the retail location submitting the electronic invoice;
- an invoice identification field, which stores a unique identifier for the invoice assigned by the retailer;
- a payment vehicle identification field, which stores the identification number of the payment vehicle employed by the customer to pay for the transaction;
- an invoice number field, which stores a unique identifier for the invoice assigned by data warehouse 185;
- a date field, which stores the date on which the transaction occurred; and
- a total amount field, which stores the total dollar amount of the transaction.

Data warehouse 185 preferably further comprises a data structure 601 for storing information regarding each line item on the received electronic invoice. When an electronic invoice is received by data warehouse 185 it creates a new record for each line item on the invoice. In a preferred embodiment, the record may comprise the following fields:

- an invoice identification field, which stores the unique identifier for the invoice assigned by the retailer;
- a product code field, typically the UPC or other standard code for the purchased item;
- an invoice number field, which stores the unique identifier for the invoice assigned by data warehouse 185; and
- a line item total amount field, which stores the total dollar amount of the line item entry.

Data warehouse 185 further comprises a data structure 602 which stores universal identification codes for every product stored in data warehouse 185. The purpose of this data structure and a preferred embodiment for its design will now be described.

The UPC coding scheme cannot be used to cross reference marketing data by category, such as by product type or class. This is because the UPC is not a hierarchical coding scheme. Instead, each UPC number as a whole identifies a particular product made by a specific manufacturer. The digits which make up the code, however, do not convey any substantive information regarding the class of products to which the particular product belongs.

In contrast, the present invention preferably employs a hierarchical coding scheme in which each portion of a code identifies a significant characteristic of the product. Thus, the structure of the coding scheme itself conveys information about the relationship between different products stored in data warehouse 185. As noted below, this hierarchical scheme facilitates search and analysis of the collected marketing data stored in data warehouse 185. The particular hierarchical scheme employed is not critical to implementation of the present invention.

In a preferred embodiment, the hierarchical coding scheme of the present invention comprises a plurality of unique universal identification codes, called UIDCs. Each UIDC is preferably descriptive of a particular product or service category in such a manner that the critical characteristics of the product or service category can be determined by resorting to the UIDC definitions associated with the category's code.

Illustratively, the hierarchical system of the present invention might classify tennis shoes as a product category and assign to that product category a unique UIDC. The hierarchical scheme might further classify tennis shoes as a subcategory of athletic footwear. Athletic footwear might itself be a subcategory of a broader category encompassing footwear generally, which might in turn be a subcategory of a still broader category encompassing clothing of all varieties.

In the above illustrative example, the UIDC for tennis shoes may preferably comprise a plurality of code segments. A first segment would identify tennis shoes as belonging to the category of clothing. The UIDCs of all product categories belonging to the clothing category would share this code segment. A second segment would identify tennis shoes as belonging to the subcategory of footwear. The UIDCs of all product categories belonging to the footwear subcategory would share this code segment. A third segment would identify tennis shoes as belonging to the subcategory of athletic footwear. The UIDCs of all product categories belonging to the athletic footwear subcategory would share this code segment. A fourth segment would uniquely identify the product category of tennis shoes, as distinguished from other product categories in the athletic footwear family.

The present invention is not limited to the particular hierarchical coding scheme described above, and may employ any suitable hierarchical code, including those that do not comprise a plurality of code segments as in the above illustrative example.

Once a hierarchical coding scheme is adopted, each product or service stored in warehouse 185 (as identified by a unique UPC number) is assigned one or more UIDCs corresponding to the product categories to which the product or service belongs. In the above example, Nike (TM) tennis shoes and Addidas (TM) tennis shoes, each bearing distinct UPC codes, would be assigned the same UIDC corresponding to the tennis-shoe product category.

In a preferred embodiment, data structure 602 contains a plurality of records, each of which stores data relating to one universal identification code. Preferably, each record contains the following fields:

- a universal identification code field, which stores the universal identification code for a product;

a description field, which defines the scope of products included within the universal identification code; and a keywords field, which stores a set of keywords that may be used to facilitate the look up of unknown codes. For example, the system may be programmed to retrieve all UIDCs associated with a particular keyword, or group of keywords, entered by a user.

Data warehouse 185 further comprises a data structure 603 which stores information regarding manufacturers. In a preferred embodiment, each record in data structure 603 comprises the following fields:

a manufacturer identification field, which stores a unique identifier assigned to the manufacturer by data warehouse 185; and a manufacturer information field which stores further information relating to the manufacturer such as its name, address, and telephone number.

Data warehouse 185 further comprises a data structure 604 which stores information relating to each marketed product and links the product to one or more universal identification codes. As those skilled in the art will recognize, manufacturers may at times bundle together the sale of two or more items, and assign to the bundled items a single UPC number. In that instance, data structure 604 associates two or more universal identification codes (one for each bundled item) with a single UPC number, as described below. In a preferred embodiment, each record in data structure 604 comprises the following fields:

a universal identification code field, which stores the universal identification code for the product (or more than one universal identification code in the case of bundled products);

a product code field, which stores the UPC number for the product;

a manufacturer identification field, which stores the identity of the manufacturer of the product;

a product name field, which stores the name assigned to the product by the manufacturer;

a description field, which stores a description of the product; and a keywords field, which stores a set of key words that facilitate looking up products. For example, the system may be programmed to retrieve all UIDCs associated with a particular keyword, or group of keywords, entered by a user.

Data warehouse 185 further comprises a data structure 605 which stores information relating to customers. In a preferred embodiment, each record in data structure 605 comprises the following fields:

a customer identification field, which stores a unique identifier assigned to the customer by data warehouse 185; and a customer information field, which stores other information regarding the customer such as the customer's name, address, and telephone number.

Data warehouse 185 further comprises a data structure 606 which stores information concerning retailers. In a preferred embodiment, each record in data structure 606 comprises the following fields:

a retailer identification field, which stores a unique identifier assigned to the retailer by data warehouse 185; and a retailer information field, which stores further information relating to the retailer such as the retailer's name, address, and telephone number.

Data warehouse 185 further comprises a data structure 607 which comprises a Geographical Information System (GIS). As known in the art, a GIS comprises a set of tables that link groups of customers on the basis of distinct parameters, including: residence, age, ethnicity, family status, phone numbers, taxes, vocation, number of credit cards held, etc. Data structure 607 facilitates analysis of the marketing data stored in data warehouse 185 across segments of the population, as described below. For example, using the linking tables of data structure 607, the system may generate a list of all households in the southwest United States with four or more members and a household income of at least $45,000/yr., in which one or more members of the household is employed by an insurance company.

Data warehouse 185 further comprises a data structure 608 which links particular payment vehicles to particular individuals. In a preferred embodiment, each record in data structure 608 comprises the following fields:

a vehicle identification number, which stores the identification number of a payment vehicle; and a customer identification number, which stores the identification number of a customer associated with the payment vehicle.

Data warehouse 185 further comprises a data structure 609 which links particular retailing locations to particular retail companies, since each retailer may maintain more than one retail location. In a preferred embodiment, each record in data structure 609 preferably comprises the following fields:

a retailer identification field, which stores the identification number of the retailer which maintains the retail location; and a retail location identification field, which stores the unique identifier typically allocated by credit authorization location 165 to identify a retail location.

The data structures described above permit data warehouse 185 to be flexibly searched using a wide assortment of search queries. This permits particularized market data satisfying any specific constraint or combination of constraints on the values of the fields in data structures 600–609 to be retrieved from data warehouse 185. Illustratively, a user would be able to determine:

(1) total volume of sales of tennis shoes (UIDC 123-456-789) over the past 24 months, grouped by month and state.

(2) the percentage of athletic footwear sold in the last year that was manufactured by Nike (TM).

(3) the name and address of every person who purchased footwear from Addidas (TM) and at least one other company in the past year.

(4) line item details of every purchase made by John Q. Doe using payment vehicle Master Card (TM) 1234 5678 9012 3456 during the period 6/24/97 to 7/23/97.

(5) a list of every American Express (TM) cardholder who has purchased within the last three weeks a combination of running shoes, running shorts, and running socks in a premium price range.

(6) total sales volume of bicycle helmets in a defined price range.

(7) total sales volume by brand of all power tools purchased in the last six months.

Those skilled in the art will understand how to program a general purpose computer to interactively query data warehouse 185 in order to obtain responses to the above queries, and others. As those skilled in the art will recognize, the system of the present invention facilitates such searches in several specific ways. By way of example and not limitation, the hierarchical coding scheme of the present invention permits the system to search the collected marketing data at many conceptual levels. As noted above, for example, the UIDC for a particular product category (e.g., tennis shoes) may identify the product category as belonging to a progression of hierarchically related, successively broader, categories. This permits the system to more easily respond to queries of varying breadth, ranging from narrow queries concerning a single product or service category to broader queries concerning classes of related product and service categories.

It should be recognized that specific queries to data warehouse 185 may be restricted by law or for other reasons. For example, accessing customer-specific purchasing information might be prohibited by law in some states. Similarly, credit authorization location 165 might contractually obligate data warehouse 185 to limit customer-specific queries for reasons of public relations or to stop customers from abandoning payment vehicles issued by the credit authorization institution.

While the invention has been described in conjunction with specific embodiments, it is evident that numerous alternatives, modifications, and variations will be apparent to those skilled in the art in light of the foregoing description.

We claim:

1. A method of collecting marketing information, comprising:
    collecting, at a first point-of-sale operated by a first retailer, line item data pertaining to a first transaction;
    establishing a first communication link between the first point-of-sale and a credit authorization location operated by a credit authorization authority distinct from the first retailer;
    transmitting a first credit authorization request from the first point-of-sale to the credit authorization location via the first communication link;
    transmitting the line item data pertaining to the first transaction from the first point-of-sale to the credit authorization location via the first communication link;
    collecting at a second point-of-sale operated by a second retailer, line item data pertaining to a second transaction;
    establishing a second communication link between the second point-of-sale and the credit authorization location, the entity operating the credit authorization location being distinct from the second retailer;
    transmitting a second credit authorization request from the second point-of-sale to the credit authorization location via the second communication link;
    transmitting the line item data pertaining to the second transaction from the second point-of-sale to the credit authorization location via the second communication link; and
    storing the transmitted line item data pertaining to the first and second transactions in a searchable database operated by an entity that is distinct from the first and second retailers.

2. The method of claim 1 wherein the point-of-sale is an internet website.

3. The method of claim 1 wherein the line item data comprises a UPC number for each line item, the method further comprising:
    storing the line item data transmitted from the point-of-sale at a location remote from the point-of-sale;
    identifying a product or service category identifier for each line item on the basis of the item's UPC number;
    storing each product or service category identifier in linked association with the line item for which it was identified.

4. The method of claim 1, further comprising:
    cross-referencing stored data relating to a first item with stored data relating to a second item to determine the number of purchasers who purchased the first item who also purchased the second item.

5. The method of claim 1, wherein the line item data comprises a plurality of line items, each line item comprising one or more pieces of information regarding a product including at least a product identifier, further comprising:
    storing in a database each of the line items;
    defining a plurality of hierarchical identifiers;
    associating each hierarchical identifier with a single product type, each hierarchical identifier identifying both the product type and a class of items to which the product type belongs;
    associating each hierarchical identifier with a plurality of product identifiers;
    matching at least one hierarchical identifier to each line item;
    storing the hierarchical identifier in the database in linked association with the line item to which it has been matched.

6. The method of claim 5, further comprising:
    querying the database to recover information concerning line items matched to a plurality of distinct hierarchical identifiers by specifying in the query a class of items associated with all of the plurality of hierarchical identifiers.

7. The method of claim 1, wherein the line item data is stored in a database in linked association with the residence address of the individual executing the transaction.

8. The method of claim 1, further comprising:
    storing the line item data pertaining to the first and second transactions in a database in linked association with data comprising a Geographical Information System.

9. A system for organizing marketing data, comprising:
    a first point-of-sale computer belonging to a first retailer;
    a second point-of-sale computer belonging to a second retailer;
    a credit authorization computer belonging to a credit issuing institution distinct from the first and second retailers;
    a first communications link linking the first point-of-sale computer and the credit authorization computer;
    a second communications link linking the second point-of-sale computer and the credit authorization computer;
    a data storage connected to the credit authorization computer;
    a database resident in the data storage and comprising a plurality of data structures;
    wherein at least one of the data structures stores line item information pertaining to a plurality of transactions executed by the first and second point-of-sale computers and reported to the credit authorization computer; and
    at least a second one of the data structures stores information indicative of the payment vehicles used to pay for the plurality of transactions;
    the payment vehicle information for each transaction of the plurality of transactions being linked to the line item information for the transaction.

10. The system of claim 9 wherein the data storage is located remote from the credit authorization computer.

* * * * *